Jan. 19, 1960     B. C. VON PLATEN     2,921,558
FOUNTAIN PENS

Filed March 7, 1957     7 Sheets-Sheet 2

INVENTOR
BALTZAR CARL VON PLATEN
BY

ATTORNEYS

Jan. 19, 1960　　　B. C. VON PLATEN　　　2,921,558
FOUNTAIN PENS

Filed March 7, 1957　　　7 Sheets-Sheet 5

INVENTOR
BALTZAR CARL VON PLATEN
BY

ATTORNEYS

United States Patent Office 2,921,558
Patented Jan. 19, 1960

2,921,558

FOUNTAIN PENS

Baltzar Carl von Platen, Stockholm, Sweden

Application March 7, 1957, Serial No. 644,613

Claims priority, application Sweden July 8, 1955

18 Claims. (Cl. 120—42.16)

This is a continuation-in-part of my copending application Serial No. 557,228, filed December 30, 1955, now abandoned.

The present invention concerns a writing instrument having a main ink container and a reserve tank communicating therewith said main container being separated from the atmosphere with the exception of a communication via a capillary ink conductor and at least one air conductor said ink conductor having its mouth inside said main container in an ink capturing means merging into said container and spaced from the axially opposed end walls thereof and has for its main object to prevent leaking and dripping of ink from the writing part of the instrument.

The invention consists substantially therein that there are provided moistenable restriction means provided in the air conductor and adapted to be moistened by ink in the ink conductor and thereby to bar said air conductor.

The invention will be described in detail while referring to the accompanying drawings on which Fig. 11 is a longitudinal section of a modification of the embodiment shown in Fig. 5 and Figs. 12, 13 and 14 cross sections on lines XII—XII, XIII—XIII and XIV—XIV respectively in Fig. 9, Fig. 11 being on an enlarged scale, and Fig. 14a is a section taken on line XIVa—XIVa of Fig. 14, Fig. 15 is a fragmentary longitudinal section on an enlarged scale of a modified part of Fig. 11, Fig. 20 is a modified detail of Fig. 19, Fig. 21 being a cross section on line XXI—XXI in Fig. 20 and Fig. 22 an enlarged cross section of part 136 of Fig. 19, Figs. 23, 24 and 26 are fragmentary longitudinal sections of a modified part of the pen and Fig. 25 a modified cross section of Fig. 23.

The capillary details of Figs. 19 to 30 are, in fact, generally common to all the forms of the pen.

Figure 1:
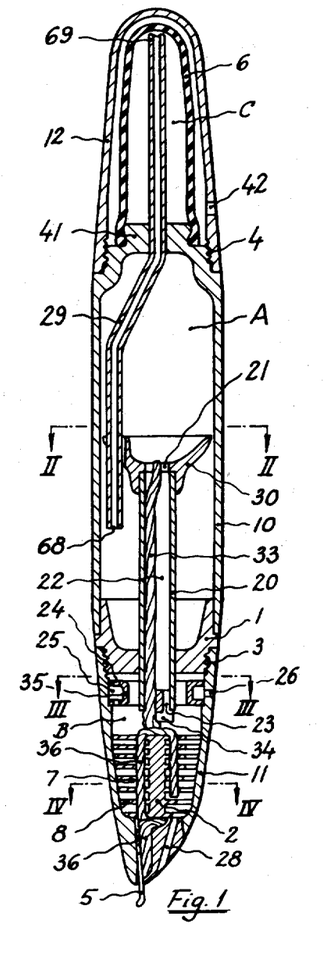
Fig. 1 is a longitudinal section of an embodiment of the invention and Figs. 2, 3 and 4 cross sections thereof on lines II—II, III—III and IV—IV respectively.
Figure 2:
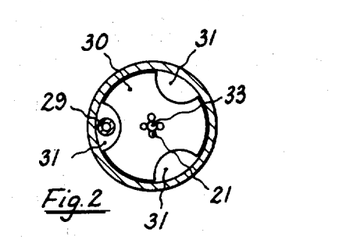
Figure 3:
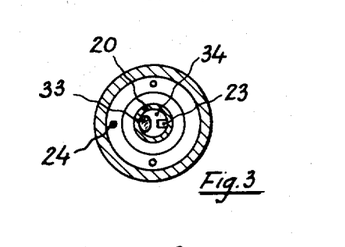
Figure 4:
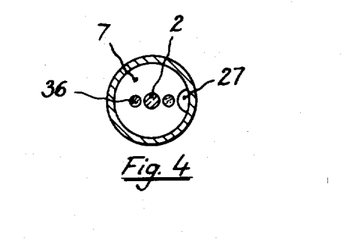

In Fig. 1 the shaft of the pen consists of three parts, namely the middle tubular part 10, the lower cup-like part 11, and the upper cup-like part 12. The middle part 10 forms the side walls of the main tank A. The cavity of the lower part 11 forms a chamber B which contains a drip-preventer 7, whilst the upper part 12 covers a rubber or plastic bulb 6, which constitutes the filling mechanism and the cavity of which forms the reserve tank C. The drip-preventer 7 is formed of a number of discs 8 carried by a pin 2 and in contact with two wicks or porous rods 36 leading down to the writing part, in this instance illustrated as nib 5. In the bottom of part 10 sits a plug 1 which is equipped with screw threads 3. By this means the part 11 can be screwed fast to the plug 1. The part 12 is screwed fast to 11 by means of the threads 4. Into the plug 1 is set a tube 20 the channel of which forms an air conductor 22. The tube reaches to about the centre of tank A. At the top of this tube is fastened a little bowl 30 and this forms together with the channel 22 a writing tank. In the bowl 30 there are three recesses hollowed out, as shown in Fig. 2. In the bottom of the bowl and in immediate proximity to its centre there are several fine holes 21 (see Fig. 2). Between these is fastened a wick constituting a capillary ink conductor 33 (Figs. 1 and 2) which leads through the channel 22 down to this channel's lower end. Here the wick is fastened into the little plug 34. In this plug, which sits in the lower end of the channel 22, is a cut or groove 23. In chamber B, the wick 33 makes contact with the wicks 36. There is direct contact between the two wicks 33 and 36. In the periphery of the drip-preventer is at least one recess or groove 27 (Fig. 4) which runs parallel to the geometric axis of the pen. Through this groove, or grooves, the drip-preventer is surrounded by the outside atmosphere, which has free entry to chamber B in a way that shall shortly be described. It is suitable to make the parts 2, 8 of the drip-preventer 7 of porous, moistenable material, such as porous rubber, but solid polyvinyl chloride may be used for example, or other moistenable plastic. In this case, however, the surfaces of all discs should be mat, so that they may more easily be wetted by the ink.

In the upper part of chamber B is glued fast, to part 11, a trough or hollowed ring 35 forming a duct 25 between itself and part 11. This duct 25 communicates with space B by means of a number of fine holes 24 in the ring 35, and with the surrounding atmosphere by means of a small hole 26. Thus chamber B is in communication with the surrounding atmosphere through the small channels 24, 25 and 26. The atmosphere has further access to the upper part of chamber B through the fine channel 28, which opens into the chamber's lower part, and through the recesses or groove 27. Main tank A communicates thus with chamber B through the channels 21, 22 and 23, and the latter chamber has two communications with the surrounding atmosphere, namely channels 24—25—26 and 27—28. The resistance to diffusion through these two last connections is great so that evaporation from the drip-preventer 7 shall be as little as possible. The connection 24—25—26 is necessary only when the surrounding atmospheric pressure sinks very rapidly. In this way atmospheric pressure will always reign in tank B. If ink is moistening the wick 33, as described further below, ink will also moisten and fill out the capillary 23 thus forming an air barrier. During writing this air barrier will maintain a slightly negative pressure in chamber A so that no ink in excess of that required for the writing will pass down into the chamber B while the corresponding volume of air bubbles in through the barrier just as in an ordinary fountain pen.

The channels 21, 22, 24, 25, 26 and 28 should not be moistenable on their inside surfaces. But the channel 23 should be moistenable. Teflon or polytetrafluor ethylene is a material which is not moistened by ink, when it is press-molded and smooth. It is, on the other hand, not especially suitable when turned, or in some other way machined. Teflon covered with thick silicon grease is very good indeed. Stainless steel or other suitable metal covered with silicon grease or paraffin is good.

The main tank A and reserve tank C communicate with each other through the narrow tube 29 which is set fast into the ceiling 41 of tank A. One end 69 of this tube gives into reserve tank C at its highest point. The edge of this opening 69 is uneven, so that it cannot be blocked by contact with the wall of the bulb 6. The other end, the opening 68, gives into chamber A at a point somewhere between the bowl 30 and the main tank's bottom formed by the plug 1. Somewhere in part 12 there is a fine hole 42.

When the user wishes to fill the pen, he shall first screw off the parts 11 and 12, after which he dips the protruding end of the tube 20, that is to say the lower opening of the channel 22, into the ink supply, and presses the rubber bulb 6 several times. At each pressing of the bulb air is pressed out of tank C and leaves the pen via tube 29 and channel 22. When releasing the bulb, ink is drawn through channel 22 into tank A and, after some pressings, also through tube 29 into tank C. Finally, this is entirely filled with ink. When then the bulb 6 is again pressed, ink will flow down through tube 29 to tank A and raise its level and force out some further air. When releasing the bulb further ink will enter tank A and raise its ink level above the level of opening 68. However, the highest possible ink level obtainable will be that of the edge of the bowl 30 because then the expulsion of ink when pressing the bulb 6 will be of the same volume as that drawn into tank A when releasing the bulb 6. The result is then that the whole of reserve tank C and main tank A up to the edge of the bowl 30, that is to say about half this chamber, will then be filled with ink. It should be noted that the air may be forced almost completely from reserve tank C because the outlet of the tube 29 is at the top of this tank. After this the parts 11 and 12 are screwed back on.

It is now imagined that the pen contains the newly mentioned maximum amount of ink, or somewhat less. The pen may be in a nib-downwards position. The bowl 30, channel 22 and drip-preventer 7 are empty. They thus contain only air, as is also the case with the upper part of main tank A. When the pen is turned nib-upwards, ink flows through the recesses or groove 31 (Fig. 2) from the lower to the upper part of tank A, the upper part now being in reality at the same or lower level. When the pen is turned back with the nib directly or at an angle downwards, most of the ink runs back to the lower part of tank A. That which does not return to the lower part of the chamber has been captured in the bowl 30. Of this ink, some runs through the wick 33 down into the channel 22, filling the greater part of it. The corresponding volume of air bubbles in through the fine holes 21 into tank A. Ink reaches the nib through the wicks 33 and 36.

When the pen is then written with, air bubbles through the fine channel 23 into the channel 22. This channel 23 should thus have dimensions dictated by the same laws as the corresponding channel in an ordinary fountain pen.

The maximum volume of ink with which one may write before it is necessary once again to turn the pen in the manner described above, we shall call V. This volume is thus in the first design of the pen equal to the sum of the maximum volumes of ink in the bowl 30 and in the channel 22. It should, however, also be mentioned that it is practically never necessary consciously to turn the pen to be able to write with it, for this occurs unconsciously almost always sufficiently often.

It is now assumed that the channel 22 and the bowl 30 contain the maximum volume of ink, V, that the pen is pointing more or less nib-downwards and that the surrounding atmospheric pressure falls as when the aircraft climbs, for example. The air in the main tank A expands, wherewith ink is forced out and is contained by the drip-preventor 7. This latter's capacity is taken to be greater than V. Soon the entire ink volume V has been forced into the drip-preventor. If the aircraft continues to climb and the pen is still held nib downwards, only air from main tank A will hereafter escape via conductor 22, channel 23 into chamber B and the passage 24, 25, 26 and/or the channel 28 to the atmosphere. One may write undisturbed with the pen the whole time, for ink reaches the nib from the drip-preventor 7. But imagine that the pen is now turned nib-upwards so that the bowl 30 and the channel 22 are once again filled with ink from the main tank A and the pen then turned nib-downwards again, all the while the aircraft continues to climb. Ink begins once more to flow to the drip-preventor, which soon contains the ink volume 2V. From this it is understood that a condition that is required that the pen shall not leak when in flight in an aircraft, is that the capacity of the drip-preventor be a certain function of the number of times the pen may be turned whilst the aircraft is climbing. This condition is of course impossible to fulfill, it being unknown how many times the pen shall be turned. It can only be said that the risk appears to be very small if the capacity of the drip-preventor is made 3V, it being highly unlikely that the pen be turned more than three times during the short time in which the aircraft climbs. When the aircraft dives, all the ink in the drip-preventor is sucked back into chamber A. This, however, happens only if the aircraft dives at a normal rate.

If the pen is nib-upwards, at an angle upwards, or horizontal during the time the aircraft climbs, no ink can accompany the air stream escaping from chamber A. The bowl 30 is as stated unmoistenable on its inside surface, and therefore the ink level in main tank A cannot reach the holes 21. It is remarkable the precision with which this phenomenon functions. Care must, however, be taken not to smear the bowl's inner surface with a substance which though admittedly unmoistenable in its pure form, becomes impure and moistenable because it absorbs the colouring substance in the ink.

That part of main tank A above the bowl 30 is as large, or larger, than the part below the bowl. Thus the ink surface in tank A cannot reach the bowl when the pen is directly nib upwards, or generally, in whichever position the pen may be in relation to the vertical.

When ink is to be transferred from the reserve tank C to the main tank A, the pen should be held nib downwards.

Figure 5:
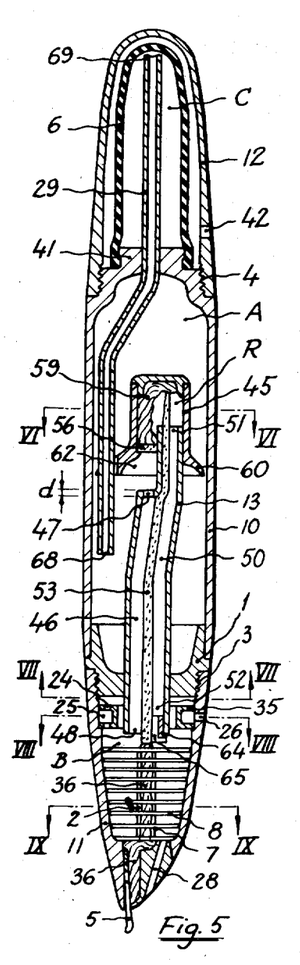
Fig. 5 is a longitudinal section of a second embodiment Figs. 6, 7, 8 and 9 being cross sections on lines VI—VI, VII—VII, VIII—VIII and IX—IX in Fig. 5 and Fig. 10 an enlarged view of a part of Fig. 5.
Figure 6:
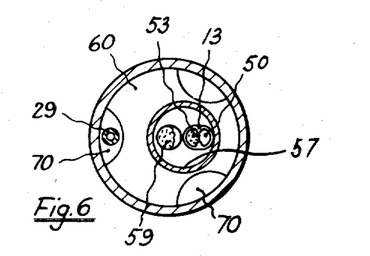
Figure 7:
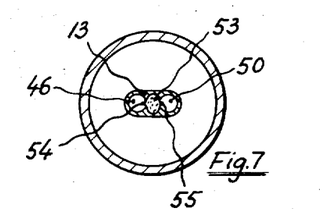
Figure 8:
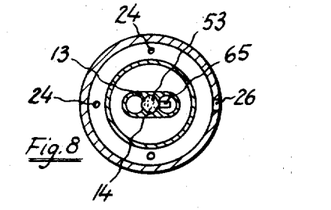
Figure 9:
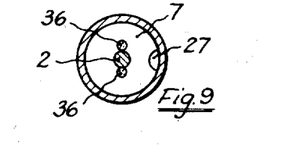

In the embodiment according to Fig. 5 there is placed near the centre of gravity of main tank A a small writing tank 45. The space within the latter is called R. From this leads a tubular member 13 to chamber B. Member 13 has different channels. One such channel 46 has its upper outlet 47 in main tank A in a position on the pen's centre line a little below the centre of gravity. Its lower outlet 48 is in chamber B. Another channel 50 of member 13 has its upper outlet 51 in the said space R, whilst its lower outlet 52 is in chamber B. Channel 50 forms a first branch of the air conductor and channel 46 a second branch thereof. The space R together with the space of channel 50 forms here the writing tank. The member 13 is made of a material not moistenable by the ink, or the inner surfaces of channels 46 and 50 are covered with such a substance. This applies also to the outer surface of member 13 outside the channel 46, at least in the vicinity of the outlet 47. Within a third central channel 14 there is a wick 53, of for example cotton or porous, elastic material, which forms the ink conductor and conducts the ink to the nib 5. At the small distance d beneath the outlet 47 the channel 50 is united with the channel 46. These channels then run together downwards as far as the outlets 48 and 52. The three channels 46, 14 and 50 are cut longitudinally along adjacent sides so that fine longitudinal slits 54 and 55 are formed as in Fig. 7, and between these two slits runs the wick 53 in the channel 14. This wick 53 thus does service not only as the ink conductor from the point 47 to 48, but also as an uninterrupted porous diaphragm between the two branches 46 and 50 of the air conductor. Through this wick or diaphragm, ink can flow without encountering much resistance from one channel to the other, if only there is some small force to drive it. Air, however, cannot flow through the diaphragm when it is wet with ink, as it always is when there is ink in space R. The above distance $d$ is less than the least drop which can fill out the channel 46. Thus contact is always established between the wick 53 and such a drop, however little it may be, which for any reason may have entered the channel 46 at it upper outlet 47. Whenever there is a drop of ink within the channel 46, it has thus, through the wicks 53 and 36, moisture-conducting, capillary connection with the drip-preventor 7. It has the same sort of connection with the ink in main tank A through this wick 53 and a porous disc 56 in the pen's centre line, which disc shall shortly be described.

The cylindrical part 45 of the writing tank continues downwards towards the nib a few millimetres in the form of diverging skirts 60 forming a bowl 62 facing the pen nib 5 and constituting an ink capturing means. The bowl 62 is provided with several recesses 70 between the skirt portions 60. This bowl 62 is on the inside not moistenable by ink. In the part forming the base of the bowl 62 when the pen is upside down, the upper end of member 13 is accommodated and also a porous disc 56 which covers a hole 57 therein. This disc 56 makes contact with the wick 59 within space R. This wick is in capillary contact with the upper end of wick 53 projecting into the space R. The outer diameter of the tank 45 is somewhat less than that of main tank A.

Figure 10:
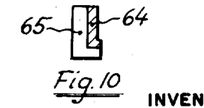

The unmoistenable channel 50 is stopped at its outlet 52 by a plug 64 (see also Fig. 10), in which there are one or several holes or short channels 65. It should be of moistenable material. It is best made of a porous, moistenable substance. When the pin is writing, air bubbles in the normal way through the hole or holes 65.

Assume that there is ink in the lower part of main tank A and that reserve tank C is completely full and space R empty. The pen is pointing nib-downwards. The user now turns the pen upside down, or more exactly, so that the nib is straight or at an angle, upwards. When we turn the pen in this way, ink runs through one or more of the recesses 70 down into the upper part of main tank A, which is now below. At the same time air bubbles through other recesses 70 into the lower part of tank A, which is, of course, now above. Some ink is captured by the bowl 62. This ink runs into the empty space R through the filter-disc 56. When the pen is turned back again nib downwards, this ink remains in the said space R. It cannot reenter tank A without the same volume of air bubbling in through the opening 51. But the latter is so finely dimensioned that this cannot occur. The ink continues through the wicks 59 and 53 down towards the nib. The hole 65 is therewith stopped with ink, which hole in the ordinary way is a passage for the bubbling in of air when the pen is writing. The width of the hole is determined, as is known, by the ink's pressure at the nib. The volume of the air streaming through the channels 65 and 50 to the space R is equal to the volume of that ink which leaves this space at the same time. The pores of filter 56 shall be fine enough to prevent air from flowing through them and bubbling into space R due to the lower pressure in this chamber. A reduction in pressure occurs here when the pen is pointing nib downwards for the same reasons as in ordinary fountain pens.

When the surrounding atmospheric pressure falls, for instance, when the aircraft climbs, the air within the pen expands. From main tank A air streams through the channel 46 to the outside. This can take place in whichever position the pen may happen to be in without ink accompanying the air stream, if only the channel 46 is unmoistenable with ink on the outside of member 13 in the vicinity of the outlet 47. This member should thus here, as stated, be of or covered with a substance which ink does not wet. Teflon or certain silicon resins are suitable. Why the channel 46 should also be unmoistenable on the inside, as stated, is another matter which shall shortly be explained.

At the same time air also expands within chamber R when the aircraft climbs. Imagine that the pen is nib-downwards. Ink is then forced out of chamber R through the wick 53 and channel 50. This column of ink is never greater than that which the drip-preventor 7 can contain. When all the ink contained in space R has left this air continues to flow from space R through the channels 50 and 65 if the aircraft still continues to climb. If the pen is now turned upside down, the ink in the drip-preventer 7 runs through the wicks 53 and 59 and the filter disc 56 into main tank A, or more exactly into the bowl 62. At the same time the same volume of air streams through the channel 46 to the surrounding atmosphere. Thus the ink does not run from the drip-preventer 7 into the non-capillary space R and remain there, but only passes through this space via parts 53, 59 and 56 on its way to tank A. That this occurs is due to the fact that the channel 65 (Fig. 10) is blocked up with ink, as long as there is ink in the drip-preventer 7 and the pen is upside down. Air cannot therefore leave space R, nor, can ink enter it, either from the drip-preventer 7 or from the bowl 62 in tank A through the filter disc 56. When the drip-preventer has become empty in the pen held upside-down, the channel 65 is opened and ink flows into space R from tank A, or from the bowl 62 through the filter disc 56, whilst the same volume of air flows out of space R through the channels 50 and 65 and into main tank A through the channel 46.

Presume now that the pin is not turned upside-down, but is held continuously nib-downwards. In this case the ink remains in the drip-preventer until the aircraft begins to dive. Then the ink begins to be sucked into space R through the wick 53 and perhaps also through the channel 50. Air cannot, however, be sucked into this chamber until the drip-preventer 7 is entirely empty. When it has become empty, air is, of course, sucked forcibly into the said space R. The user may write with the pen during this time also, for the pressure of ink at the nib is still determined by the dimensions of channel 65 as in ordinary pens. Only when the drip-preventer contains ink, is this pressure determined by the drip-preventer's dimensions.

If the air-route through the channel 46 should be blocked by an ink drop in this channel, it could happen that when the pen is turned upside down, ink from the drip-preventer 7 would be unable to run into chamber A through the wick 53 and filter disc 56. A drop is able, however, to block this route only for a moment, its position of equilibrium within channel 46 being unstable. This channel's inner surfaces are, as stated, of unmoistenable material. The meniscuses are thus convex and pressure within the drop is high. The ink in this drop therefore runs through the wick 53 to that place where its potential energy is least, that is to the drip-preventer 7 when the pen is pointing nib-downwards, and to chamber A when nib-upwards. If, however, the inner surfaces of channel 46 are of moistenable material, the channel's dimensions must be such that the ink's potential energy will still be greater in the drop than in the drip-preventer 7 or chamber A.

In a slightly modified execution of Fig. 5 which modification could not easily be illustrated on the drawing, the pore or pores of the disc 56 are widened so that, in the nib-upwards position of the pen, ink may pass from the drip-preventor 7 through wick 53 and/or channel 50 to space R thereby forcing out air from space R through disc 56. When drip-preventor is empty and hole 65 not blocked by ink, ink can very quickly enter through disc 56 to said space R.

Assume that a drop of ink has blocked the outlet 51. It could then happen that ink in the upside-down pen could not flow into chamber R from the bowl 62 through the filter disc 56, even when the channel 65 (Fig. 10) is open. But if the wick 53 reaches all the way up to the roof of chamber R and here makes contact with the wick 59, as shown, the state of equilibrium of a drop in the outlet 51 is unstable. It runs, if the potential energy of the ink in chamber R (which term shall soon be defined) has a proper value, almost at once down to the lowest liquid level in chamber R, after which ink can run in from the bowl 62. It is on the other hand possible to choose the value of the potential energy of ink in chamber R so that a drop in the outlet 51 is forced away by the ink streaming in through the filter disc 56. This shall soon be described with reference to Fig. 15.

To define what we mean in this case by the potential energy of the ink in chamber R, we will imagine the pen turned upside down and the channel 65 open. The bowl 62 contains a very small quantity of ink, whose potential energy we take as being equal to zero. The said chamber R is empty. The potential energy in a certain point in chamber R is a negative quantity defined as being minus the work done when one milligram of ink flows from the bowl 62 to the said point. The potential energy of the ink in the chamber R, is a negative quantity defined as being minus the work done when the chamber is filled with ink, divided by the number of milligrams of ink with which it is filled.

From this we understand at once that if chamber R is made very small and its walls made of unmoistenable material, the potential energy can be so great that ink from the bowl 62 cannot run into the chamber. It will be especially unable to run in if an ink drop, as stated, for some reason has been able to stop the outlet 51 thereby hindering the flow of air out of chamber R. If the chamber is made small but with moistenable inner walls, the ink's potential energy can be so low that ink cannot leave the chamber and reach the nib. In both cases the pen is wrongly constructed and unusable. If on the other hand it is only clearly understood that risk for faults of construction exists, then it is extraordinarily easy to avoid them. The potential energy in chamber R can, however, be regulated by means of a simple construction which shall now be described with reference to Fig. 15.

Figures 11, 12, 13, 14, 14A, 15:
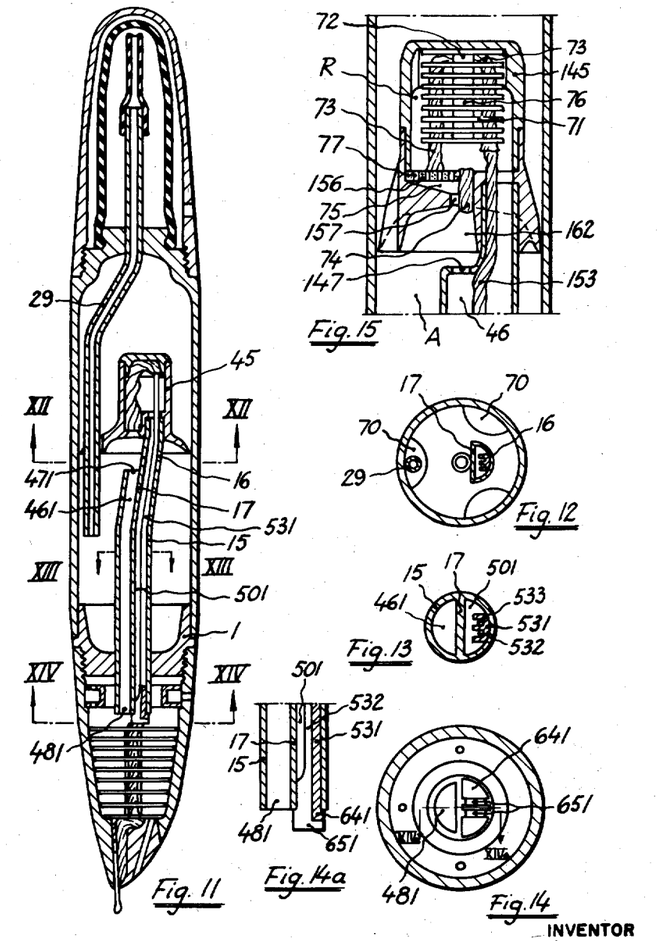

Fig. 15 shows how in chamber R is placed a packet 76 consisting of a certain number of moistenable discs 71 at a certain distance from each other and borne on a central pillar 72. It is suitable to make these discs of porous material. The packet is very similar to the drip-preventor 7. A U-formed wick 73 goes through the whole packet. Its one end is in contact with the porous disc 156. Its other end is in contact with the wick 153, compare wick 53 of Fig. 5. From this porous disc 156 leads a porous tongue or wick 74. It may be molded in one piece with the disc 56 if so desired. It must not fill out entirely the hole 157. Through the part of the hole 157 not occupied by the wick 74 rushes out air from the little space 75, when the pen is turned upside down and ink by means of capillary action enters this little space 75 for a fraction of a second. In the porous disc 156 there are several fine holes which, in accordance with what has been previously stated, shall not be so wide that they allow of an air-contact between the main tank A and the space R. By incorporating these holes ink is able to flow more quickly into space R.

We now turn the pen upside down. Ink streams then from the bowl 162 through the filter disc 156 and the wick 73 into space R, whose disc packet is first filled. Ink flows in here, driven partly by gravity, partly by the capillary action exerted through the discs 71. It will immediately be seen that the less the distance between these discs, the greater the capillary action. The energy spent in getting the ink into chamber R is thus increased, thereby decreasing the potential energy of the ink there. This is advantageous. But it will also be seen at once that the distance between discs may not be diminished unlimitedly, for then ink cannot leave space R and reach the nib. The disc packet 76 must therefore be constructed so that the potential energy of the ink in chamber R lies between two mathematically easily found limits. A column of about .5 millimeters spacing between the discs has been found to be satisfactory.

The pen can also work without diaphragm action between channels 46 and 50 in Fig. 5 and in Figs. 11 to 14 is shown an embodiment in which they are separated from each other. A member interconnecting the interior of tank 45 with the underside of plug 1 has a lower cylindrical portion 15 and an upper semicylindrical portion 16. A portion 17 divides the cavity of portion 15 into two separate compartments 461 and 501 and also form a plane wall of the portion 16. The compartment 501 forms the first branch of the air conductor and compartment 461 the second one. The ink conductor is shown as a rod 531 with two capillary grooves 532 and 533, compare Fig. 13. The porous plug 641 has two slits 651. The upper and lower outlets 471 and 481 have semicircular shape. It has been found that a disc with a fine hole may be placed in the channel 461 also, near its outlet 481, which disc is equivalent to the disc 64 with the hole 65 in Fig. 5.

Figure 16:
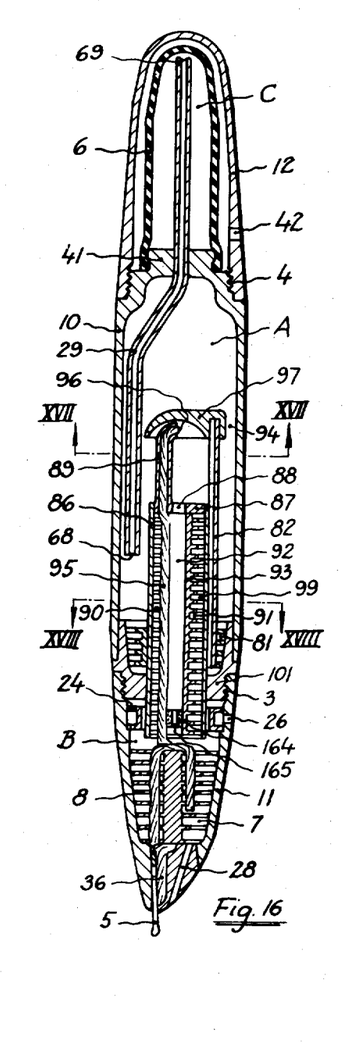
Fig. 16 is a longitudinal section of a further embodiment, Figs. 17 and 18 being cross sections on lines XVII—XVII and XVIII—XVIII respectively in Fig. 16.

Into the plug 101 in Fig. 16 is fastened a thin-walled tube 86, several millimeters in diameter. Its upper end is in main tank A, somewhat below its centre of gravity. Its lower end projects slightly into chamber B. Into the top of this tube is fastened a disc 87, which has a central hole 88, and a chimney-like pipe 89 of a suitable length of about 1 centimeter. Between the tube 86 and an inner tube 93 and preferably stretching its whole length, is a capillary tank 90, whose construction is similar to the drip-preventor 7. It consists of many annular discs 91 supported on tube 93 and preferable integral therewith. The spacing of the discs is less at the top than at the bottom. Through the middle of the capillary-tank 90 runs the channel 92 inside the tube 93. Its upper opening is formed by the previously mentioned hole 88 in the disc 87. Its lower opening is stopped by the porous and moistenable plug 164 in which there is the small hole 165. Along the length of the tube 93 is a small longitudinal slit 39 and a corresponding gap in the discs 91 in order to accommodate the wick 95 further running through the chimney-like pipe 89. The upper end 96 of this wick is near the centre of gravity of main tank A, and also near the bottom of the upturned bowl 97 facing the nib 5. The lower end of the wick is in contact with both the porous disc 164 and a wick 36 which leads through the drip-preventor 7 to the nib. The wick 95 is palpably in contact with the channel 92 along a narrow strip. Moreover, it is in contact with the capillary-tank 90, that is to say with the spaces between the discs 91. When the wick is moist with ink, a liquid-filled porous diaphragm is formed between these spaces and the channel 92, which permits the passage of ink, but not, in the normal case of air.

According to a modification the wick 95 runs solely through capillary-tank 90 without the said contact with the channel 92, given that this channel is of suitable dimensions.

The bowl 97 is attached at the point 94 to the upper end of the rod 82, the lower end of which is secured to the tube 86. This bowl 97 is smaller in diameter or width, than the main tank A. The space between the bowl and the walls of the tank is wide enough to permit the passage of ink when the pen is turned upside down. The said bowl 97 is of a smooth- non-moistenable material, like for example Teflon or polyethylene. The inside of the bowl must in all eventuality be smooth and non-moistenable. The disc 87 is, on its outside at least, smooth and non-moistenable. The same applies to the short pipe 89.

Figure 18:
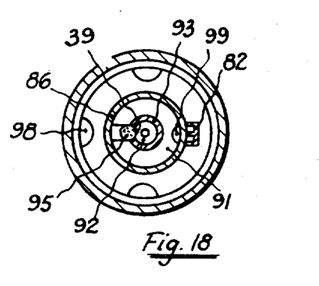

Through the capillary tank 90 and the discs 91 thereof runs a groove or recess 99 (see Fig. 18). It runs the whole length of the capillary-tank, from the chamber B to the underside of the disc 87. Through this groove communicates each and every space in the capillary-tank with the chamber B and the surrounding atmosphere. The main tank A and chamber B have not, however, communication with each other through this recess, but solely through the channel 92 and the small hole 165.

Figure 17:
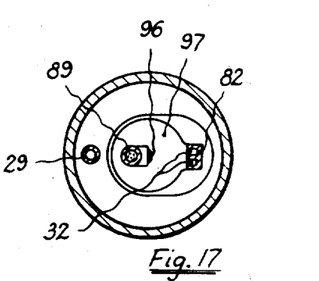

At the bottom of main tank A is arranged a small capillary-tank 81 similar to the drip-preventor 7. From this leads the above-mentioned rod 82 of moistenable material such as polyvinyl-chloride with one or two capillary-acting, longitudinal grooves 32 cut into it up to or into the bowl 97 (see Fig. 17). In the discs of the capillary-tank 81 are made the recesses or notches 98 (Fig. 18), so that ink can enter it. This arrangement may be called the ink-collecting device.

Assume now that the pen contains the above-described maximum quantity of ink or a little less. The capillary-tank 90 and channel 92 are empty. The nib may be pointing downwards. The user turns the pen upside down. When he does this, the ink in the bottom of main tank A runs past the bowl 97 into the top of that tank, which part is now downwards. Generally the ink runs past the bowl without entering it, unless its diameter or width is too large. However, the ink retained in the capillary-tank 81 runs through the grooves in the rod 82 (Fig. 17) into the bowl 97. Here it makes contact with the wick's tip 96. Through the wick it is sucked into the capillary-tank 90, which becomes approximately half-full of ink. At the same time, of course, the corresponding amount of air is driven out of the capillary-tank 90 through the groove or recess 99 (Fig. 18) the chamber B, the hole 165, and the channel 92 to the main tank A. When the user turns the pen again, so that the nib is downwards, he can write with the ink contained in the capillary-tank 90. It runs through the wick 95, and continues through the wick 36 down to the nib. These two wicks make contact with each other as shown in Fig. 16.

Each time the pen is turned upside down and then turned again with the nib downwards, an ink-drop fastens between the bowl 97 and the wick's 95 tip 96. This drop is unable to run down into the capillary-tank 90; could it do this, risk would arise that under certain conditions this tank would become over-full, and the pen would leak. The drop cannot run down into the capillary-tank, for when one turns the pen so that the nib is downwards, the hole 165 is almost immediately stopped with ink. This hole is of such dimensions that, because of the forces normally at work in the pen, air cannot force away the ink and enter into main tank A. Consequently, it is not possible either for the ink drop to leave that tank and enter the capillary-tank 90. When the pen is turned upside down, the hole 165 is opened, thereby affording main tank A free contact with the surrounding atmosphere. Thereby can the capillary-tank 90 suck in as stated the ink from the bowl 97 to the extent that the power of its own suction will allow. If the pen is held with the nib at an upwards angle only, under no circumstances can this enable too much ink to be sucked into the capillary-tank, it being understood that the hole 165 becomes blocked once more before this has been able to take place, causing the sucking in of ink to cease. It has been found fully possible to give this hole such dimensions so that this takes place. The hole is most suitably placed at the bottom, or at least near the bottom of the tube 86.

Assume that the capillary-tank 90 happens to be completely full of ink. If the pen is turned upside down some of the ink returns back to main tank A. By the same means, the drip-preventor 7 empties into this tank and also the plug 164 is released from ink. Underneath it, air is forced thence out through the hole 165 which was previously stopped by ink.

When the pen is filled, the upper part of the capillary-tank 90 is filled with ink. The lower part, where the distance between the discs is greater and the capillary-action therefore less, is, however, not filled. On the other hand, the whole of the channel 92 may be full of ink immediately after filling. In case this ink has not entered the capillary-tank 90, the little drip-preventor 7 has been provided.

It is to be noted, that in no position which the pen might have, can the ink reach the opening 88. As already stated, the outside of the disc 87 is unmoistenable. Even if the ink level in main tank A is slightly higher than the top of disc 87 ink will thus be unable to reach the opening 88.

Experiment has shown that the ink-level in main tank A will be somewhat above the outlet 88 in Fig. 16, or 47, in Fig. 5, when the pen is newly filled. This is due to a capillary phenomenon which does not here require explanation. When the surrounding atmospheric pressure falls, as when the aeroplane climbs, and when the pen is nib downwards, a volume of ink equal to the volume of the channel 92 plus the above-mentioned ink-volume above the opening 88 is thereby forced out to the drip-preventor 7. The drip-preventor must thus be of sufficient dimensions that it can contain both these volumes. But the solid material of the drip-preventor robs the pen of a certain effective ink-volume. Therefore, the drip-preventor should be made as small as possible.

In Fig. 16 channel 92 had its outlet 88 directed upwards. Experiment has shown that just this fact is the reason that the newly-filled pen has a small volume of ink (approx. .3 cm.$^3$) above the said outlet 88. If the corresponding outlet is directed downwards as in Fig. 19, this capillary phenomenon does not take place. Here, there is a tube 124, of plastic, stainless steel or other suitable material, stuck into the part of the channel 192 which runs through, or is formed by, the capillary-tank 190. The tube 124 is bent at the top, so that its outlet 125 into main tank A is directed downwards. This tube, at least near its outlet 125 and on the outside, must not be wettable by the ink, and furthermore, must here be smooth also.

Figure 19:
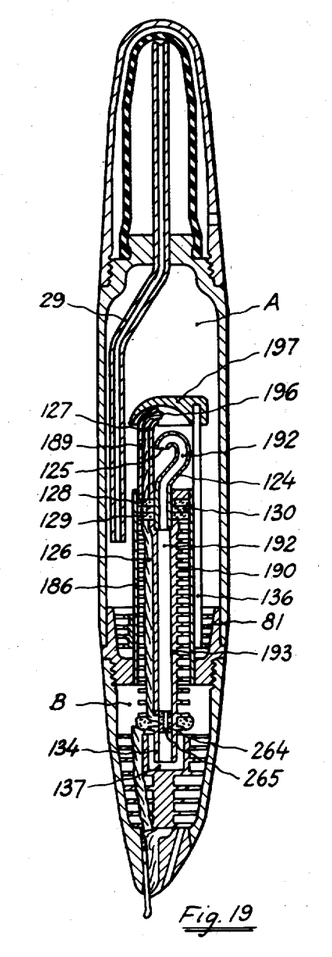
Fig. 19 is a longitudinal section of a modification of the pen illustrated in Fig. 16.

The wick 95 in Fig. 16 corresponds to the two wicks 126 and 127 in Fig. 19. The upper end of the wick 127 is marked 196, having the same function and position as the wick's 95 top 96 in Fig. 16. Between the wicks 126 and 127 in Fig. 19 are placed the coarsely porous discs or sponges 128 and 129, and between these, a more finely porous disc 130. This last disc stops air from forcing its way from main tank A through the channel 189, if during the filling of the pen, the bulb 6 should be squeezed very hard. The construction could be made simpler by leaving out the disc 130, provided the distance between the outlets 125 and 196 is as small as possible, so that at the same time the drip-preventor can be as small as possible.

Figure 20:
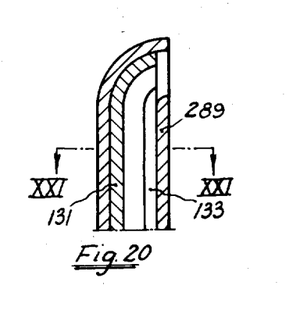
Figure 21:
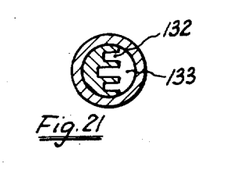

The wick 127 may either contain such fine grooves that ink remains permanently in them, or such coarse grooves that they empty each time the pen is held nib downwards. In the first instance, the grooves in the wick 127 fill with ink the first time the pen is filled. The air in the grooves is forced out through the wick's outlet 196 simultaneously with the flowing in of the ink from underneath. In order, however, that the writing-, or capillary-tank 190 shall fill as quickly as possible when the pen is turned upside down, the said grooves should be as coarse as possible. They will then release their ink each time the pen is turned nib downwards. So that they will fill again quickly when the pen is turned upside-down, there must be arranged a special channel, through which air can escape when the ink enters the grooves. How this may be constructed is shown in Figs. 20 and 21.

A rod 131 of polyvinyl-chloride or other wettable material is stuck into the channel 289, being similar to channel 189 of Figure 19. In this rod are cut, lengthwise, grooves 132, as shown in Fig. 21, which act as ink-carriers. The rod 131, however, does not occupy the whole breadth of channel 289, but only a part of it. Thus is formed the channel 133, which is coarser than any of the grooves 132. Through this channel 133 escapes air, when ink flows into the grooves 132. Of course, the outlet of channel 133 may be arranged near the convex surface of the bowl 197 instead of near the concave. Air will then not bubble through the ink in the bowl 197.

Figure 22:
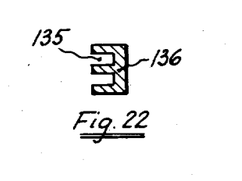

In the lower part of the pen is arranged a short tube 134 forming an end portion of tube 193. When the pen is to be filled, it is necessary only to immerse this tube in the ink supply. The principle of this arangement is known through Sheaffer's so-called "snorkel"-pen. The bottom of the capillary-tank 190 should, however, also be immersed. Ink then runs into this tank through the wick 126 by capillary action. This wick can be replaced by capillary grooves 135 in a rod 136 as shown in Fig. 22. This figure is a cross section of such a rod. The rod is of a porous wettable material, for example polyvinyl-chloride.

The rod or wick 126 in Fig. 19 is not shown as a porous diaphragm between the channel 192 and the capillary-tank 190. Experiment has shown that this diaphragm-contact is unnecessary. The communication between the chamber B and the atmosphere has been eliminated, because, as stated, this communication is only necessary in the case of rapid drops in pressure.

We shall now show, with reference to Figs. 22 to 26, further devices through which the ink-volume forced into the drip-preventor during a flight, is reduced. This is the case of the newly-filled pen in an aircraft in flight.

Figure 23:
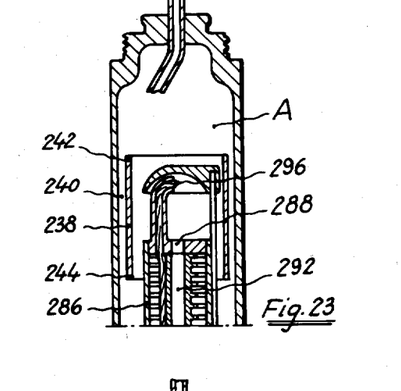

The outlet 288 of the channel 292 into the main tank A of Fig. 23 may here be directed upwards. On the other hand, there is nothing to prevent its being directed downwards like the opening 125 in Fig. 19. Between the tube 286 and the cylindrical inner wall of tank A we insert a tube 238 with the thinnest possible walls. It reaches from above the outlet 296 to below the outlet 288, within the tank A. The outer, i.e. convex surface of the tube 238 is wettable. This applies also to the inner walls of tank A. The inner or concave surface of the tube 238, on the other hand, is not wettable, and this applies also, as previously mentioned, to the solid surfaces in the vicinity of the outlets 288 and 296, which surfaces should also be smooth.

We will now assume that the ink-level within the tube 238 stands at the outlet 296. In the ring-shaped space 240 between the inner wall of tank A and the outer wall of the tube 238, the ink-level will be up to the top edge 242 of this tube 238.

The outside atmospheric pressure drops as the aircraft climbs, and ink is forced out through the outlet 288 and the channel 292. But only the ink within the tube 238 is forced out. Ink in the columnar space 240 is retained therein by capillary action. The breadth of the space 240 and the distance of the edge 242 from the outlet 288 must however be correctly calculated, otherwise it is possible for the ink-level in the space 240 to sink at the exact same rate as that of the level within the tube 238, and nothing is then won with this arrangement. If, however, these values are correctly calculated, the advantage is gained, as above stated, that only ink within the tube 238 is forced out, and this amount is between a half and a quarter the amount that would be forced from tank A without this device. The lower edge 244 of the tube 238 must lie so deep that the ink-level in tank A when the pen is horizontal does not come above the centre line of the pen and thus also over the outlet 288. When the pen is horizontal, the whole of space 240 is filled namely with ink, even that part of it which is above the fluid-level in the upper part of tank A. This will make for a lower fluid-level, which could leave the outlet 288, which is covered when the pen is newly-filled and vertical, uncovered and in contact with the air in tank A if the pen came into a horizontal position.

It should be mentioned that there can be more than one concentric tube 238 with suitable columnar spaces between. The columnar space 240 or spaces may be narrower at the top than at the bottom. The tube or tubes 238, should be as thin-walled as possible, or in general through the volume of its material rob tank A of as little space as possible. There could also be several concentric tubes 238 in the upper part of the tank A, and in the lower, only one.

Figure 25:
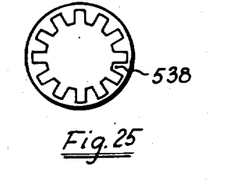

Instead of one or more tubes 238, there may be arranged on the cylindrical inner wall of tank A, as shown in Fig. 25 ribs 538 running vertically. Ink is sucked up between these by capillary action, as in the columnar space 240. The top and bottom points of these ribs is calculated in the same way as the top and bottom edges 242 and 244 of the tube 238.

Figure 24:
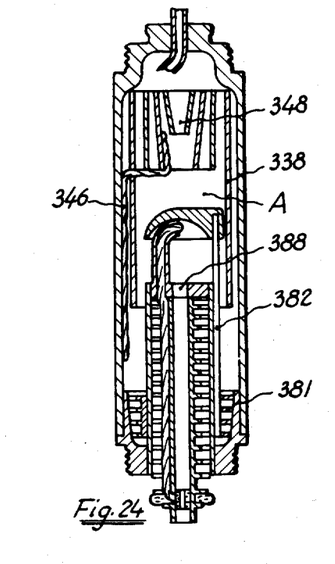

In Fig. 24 there are several tubes 338, 348 inserted in tank A. Because the columnar spaces are to be narrower at the top than at the bottom, the tubes will be conical. All the columnar spaces must communicate with each other. They can be suitably united through a wick 346, so that ink may run down to replace that which has been used up in writing.

In this construction the opening or outlet 388 or 125 will not lie so near the centre of gravity of tank A, but nearer the nib.

Figure 26:
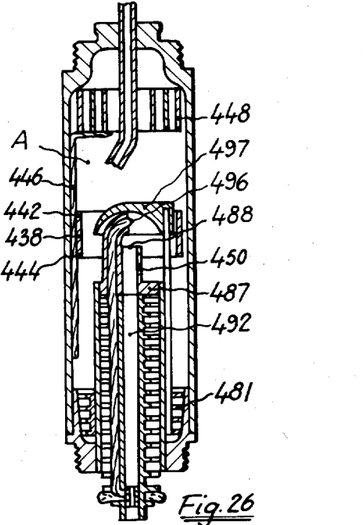

It may be said that the tubes 338 form a capillary-tank. This obtains even when there is only one tube 238 as in Fig. 23. For practical reasons, above all because ink must be able to circulate freely within tank A, it has been found desirable to arrange three such capillary-containers in the said tank. This is shown in Fig. 26. At the center of the pen there are one or more tubes 438 whose upper edges 442 do not reach higher than to about the ink-level when the pen is newly filled. Experiment has shown that this level is about at the outlet 496. The lower edge 444 of the tube 438 lies about level with or slightly lower than the outlet 488. This outlet lies at a certain distance from the disc 487, since the channel 492 has been extended so that a little pipe or chimney 450 is formed. Between the outlet 488 and the edge 444 is thus formed a rather wide cylindrical interspace, through which ink can flow freely when the pen is turned. This is of importance, that no drop, even when the pen is not newly filled, shall in spite of the smooth and unwettable surfaces fasten in the vicinity of the outlet 488 and be forced out through this when air in the pen expands. This capillary-container in the vicinity of the outlets 488 and 496 lessens, as stated, the capacity requirements of the drip-preventor.

A capillary-container 448 in the upper part of tank A increases the amount of ink with which the pen can be filled. From this upper container runs a wick 446 through the lately described central container down to the lower, but not the bottom part of tank A. It is necessary to have this wick, that the two containers may deliver their ink to the lower or bottom part of tank A when the ink here begins to be used up.

If the width of the annular interspaces in this capillary-container 448 is increased, it will not be capable of retaining ink when the pen is nib downwards. But, on the other hand, it will suck up ink when the pen is near a horizontal position. It thus lowers the ink-level in tank A when the pen is in this position, and can thus fully ensure that the pen is drip-proof.

At the bottom of chamber A there is the capillary-container 481. As described, this delivers ink to the bowl 497, and thus has an important function to fill. It is now understood that this also serves to sink the ink-level in chamber A, when the pen is horizontal. This is the same as that it can raise the outlet 488, i.e. increase its distance from the nib and therewith the quantity of ink with which the pen can be filled.

Of course, the capillary-container 448 may be formed of discs, like the capillary-container 481.

I shall now described, with reference to Figs. 27 to 30, a detail which may be made use of in all the forms of the invention. I shall, however, give closest consideration to the forms of Figs. 5 and 11.

If the pen is pointing nib downwards or at an angle downwards, and the pen is then sharply turned so that its geometrical axis is horizontal or approximately horizontal, the following can take place. Imagine that the drip-preventor 507 is empty and that the chamber R contains the maximum quantity of ink. At the said sharp movement, a wave of ink can enter the bowl 562 and reach the wick 574, see Fig. 27. An ink drop fastens upon this, which runs down via wicks 573, 553 and 536 into the drip-preventor 507 when the pen is turned nib downwards. If this procedure is repeated many times the drip-preventor will finally become full of ink, though only on the assumption that the pen is never held nib upwards a sufficient length of time for the drip-preventor to empty once more into the main tank A. This length of time is in the nature of at least a couple of seconds.

Figure 27:
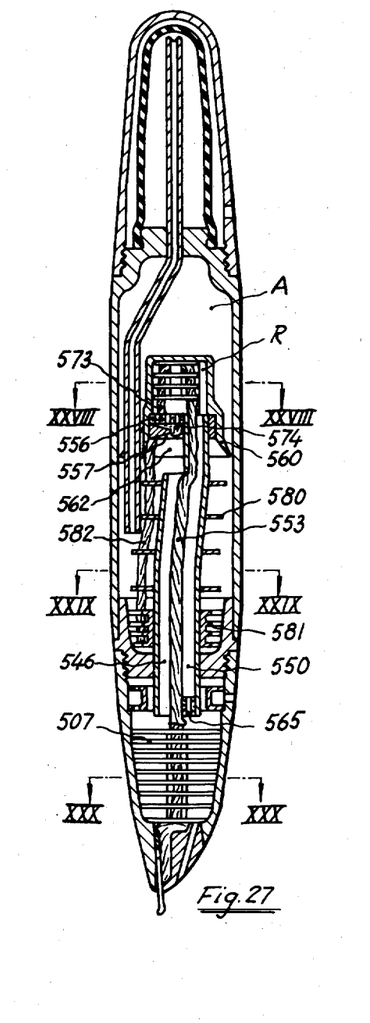
Fig. 27 is a longitudinal section of a further modification of Fig. 5, Figs. 28, 29 and 30 being cross sections on lines XXVIII—XXVIII, XXIX—XXIX and XXX—XXX respectively in Fig. 27.
Figure 28:
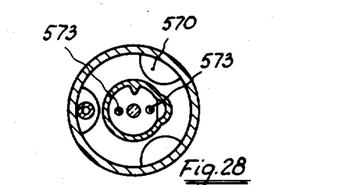
Figure 29:
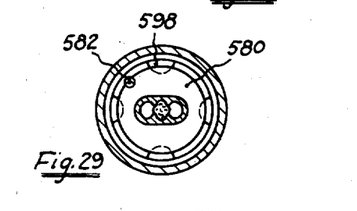
Figure 30:
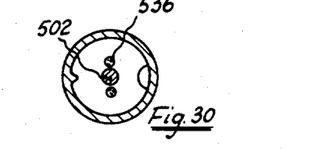

To prevent the drip-preventor becoming full as described, and thereby risking that the pen can leak in an aeroplane, the following simple device can be used. Onto the outer walls of the channels 546 and 550 are fixed a certain number of discs 580 of smaller diameter than that of tank A, at a certain distance from each other. Four such discs are shown in Fig. 27. These discs serve as a checking mechanism, or more simply described, wave-breakers, which hinder with surprising effectiveness, ink waves from reaching the wick 574. The wave-breakers stop the ink from dynamically reaching the wick 574, i.e. from reaching the bottom of the bowl 562. On the other hand, the ink is not greatly hindered from statically reaching the bowl and the said wick. When the pen is upside down some checking effect does however exist. This can be eliminated by means of the ink-capturing device consisting of a capillary-tank 581 and the ink-conductor 582. This latter runs through tank A between the discs 580 and the tank's inner wall, as shown in Fig. 27. When the pen is turned upside down, ink as mentioned runs from the capillary-tank 581 through the ink-conductor 582 into the bowl 562.

Figure 31:
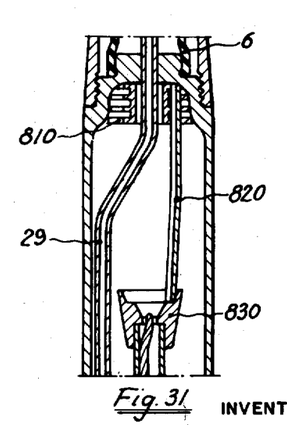
Fig. 31 is a modified fragment of Fig. 1.

When the ink-capturing device is used in a pen of the form of Fig. 1, a capillary-tank 810 may be in the top of tank A as shown in Fig. 31. An ink conductor 820 interconnects the tank 810 with capturing-device 830.

I claim:

1. A writing instrument comprising a casing, a writing element at one end of the casing, said casing having a chamber adjacent the writing element and in communication with the atmosphere, a main ink reservoir and a reserve ink reservoir in communication with the main ink reservoir, means defining a channel between said chamber and the main ink reservoir, said means extending into the main ink reservoir, a catch basin mounted within said main reservoir, a capillary ink conductor connecting said catch basin and the writing element, said conductor passing through said channel defining means, restriction means in said channel defining means adapted to be moistened by ink to block the flow of air in said channel defining means.

2. A writing instrument in accordance with claim 1 in which the catch basin is a non-capillary ink container and in which the chamber contains capillary means adapted to prevent dripping of the ink.

3. A writing instrument in accordance with claim 1 in which the catch basin is cup-shaped having its concave side facing away from the writing element and adapted to capture ink with the writing element in the downwards position.

4. A writing instrument in accordance with claim 1 in which the interior surfaces of the catch basin have a low degree of wettability by ink.

5. A writing instrument in accordance with claim 1 in which the capillary ink conductor is in free communication with the interior of the channel defining means.

6. A writing instrument in accordance with claim 1 in which the catch basin is facing in the direction of the writing element and is provided with a closed non-capillary chamber separated from the open portion of the catch basin by a capillary port.

7. A writing instrument in accordance with claim 1 in which the restriction means is positioned adjacent the end of the channel defining means which lies in said chamber.

8. A writing instrument in accordance with claim 1 in which the catch basin faces towards the writing element, a plurality of transverse ink damping discs are provided in the space between the ink conductor and the channel defining means, on the one hand, and in inside of the main container wall on the other hand.

9. A writing instrument in accordance with claim 1 in which there is provided a capillary container adjacent the writing element, the said capillary container being connected to the catch basin by a capillary ink conductor.

10. A writing instrument in accordance with claim 1 in which the mouth of the channel defining means connected to the chamber faces towards the writing element.

11. A writing instrument in accordance with claim 1 in which there is provided a second channel defining means connecting the main reservoir and the chamber for the free passage of air.

12. A writing instrument in accordance with claim 1 in which a wall separates the capillary ink conductor from the remainder of the channel defining means except adjacent the restriction means.

13. A writing instrument in accordance with claim 2 in which the restriction means comprises a porous plug having an opening provided with ink conductor capillaries in its walls which through the porous plug are in capillary connection with the capillary means adapted to prevent dripping.

14. A writing instrument in accordance with claim 3 in which the catch basin has a closed non-capillary portion separated from the main reservoir and provided with a capillary port merging with the said concave side.

15. A writing instrument in accordance with claim 14 in which the channel defining means has two branches, one of which connects the non-capillary portion of the catch basin with the chamber, and the other of which connects substantially the center of the main reservoir with the chamber.

16. A writing instrument in accordance with claim 14 in which one end of the capillary ink conductor is in capillary connection with the capillary port.

17. A writing instrument in accordance with claim 14 in which the channel defining means has two branches, one of which is connected to the non-capillary chamber, and the other of which has one end terminating in the main reservoir adjacent the writing element side of said catch basin.

18. A writing instrument in accordance with claim 17 in which only one of said branches is provided with restriction means.

References Cited in the file of this patent
UNITED STATES PATENTS 2,724,366     Miessner _______________ Nov. 22, 1955
2,762,337     Beckwith _______________ Sept. 11, 1956